Sept. 9, 1969　　　　K. O. WHITFIELD　　　　3,465,672
CREDIT CARD VERIFIER AND PRINT ENABLING MEANS
IN PRINTING APPARATUS
Filed Feb. 6, 1968　　　　　　　　　　　　4 Sheets-Sheet 1

INVENTOR
KENNETH O. WHITFIELD

BY *Towson Price*
ATTORNEY

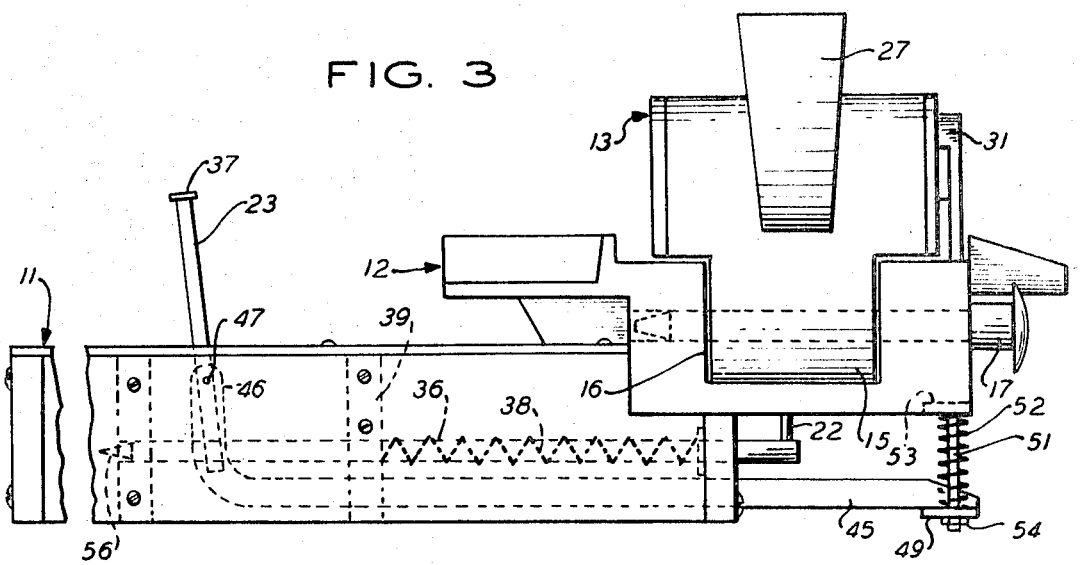
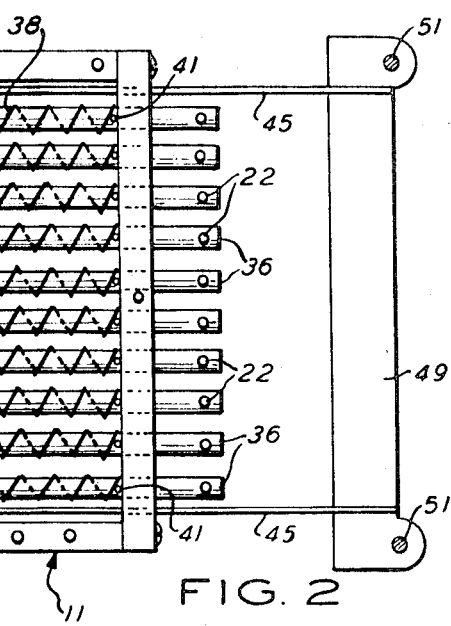
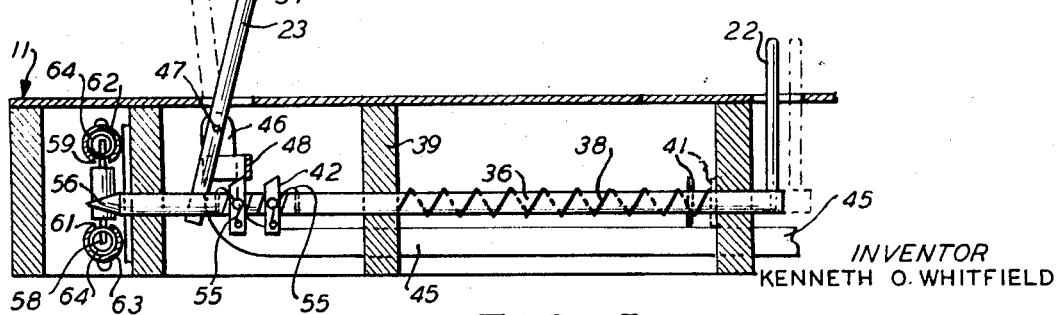

Sept. 9, 1969   K. O. WHITFIELD   3,465,672
CREDIT CARD VERIFIER AND PRINT ENABLING MEANS
IN PRINTING APPARATUS
Filed Feb. 6, 1968   4 Sheets-Sheet 3
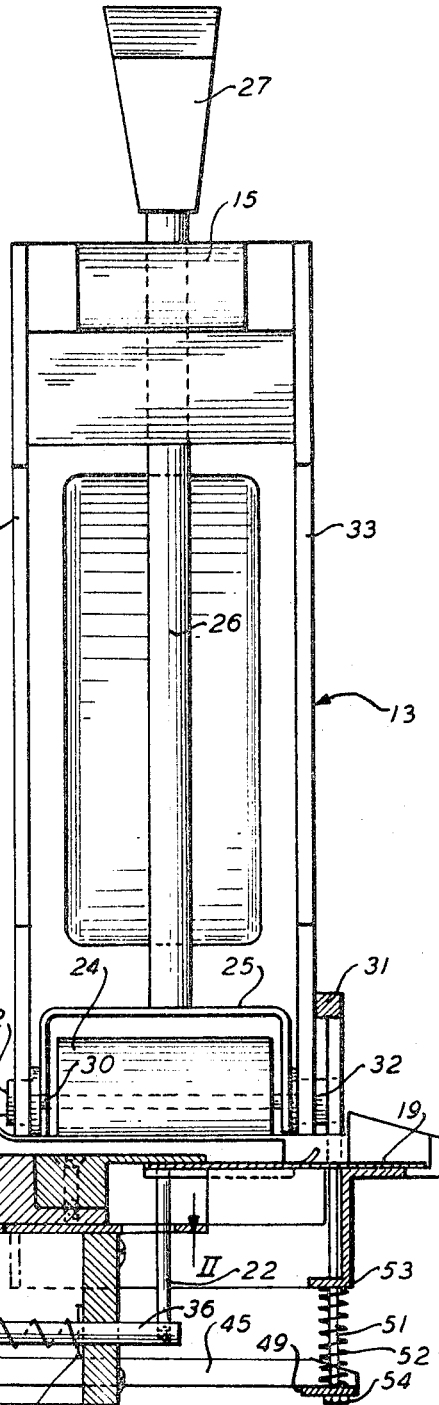
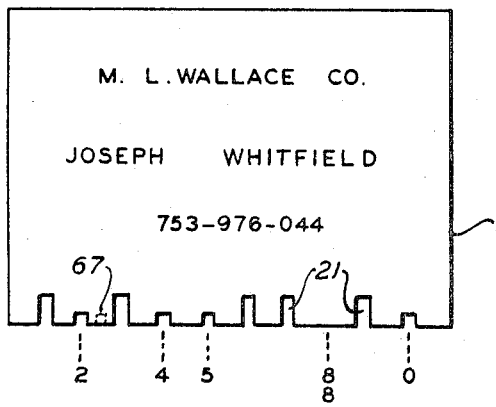
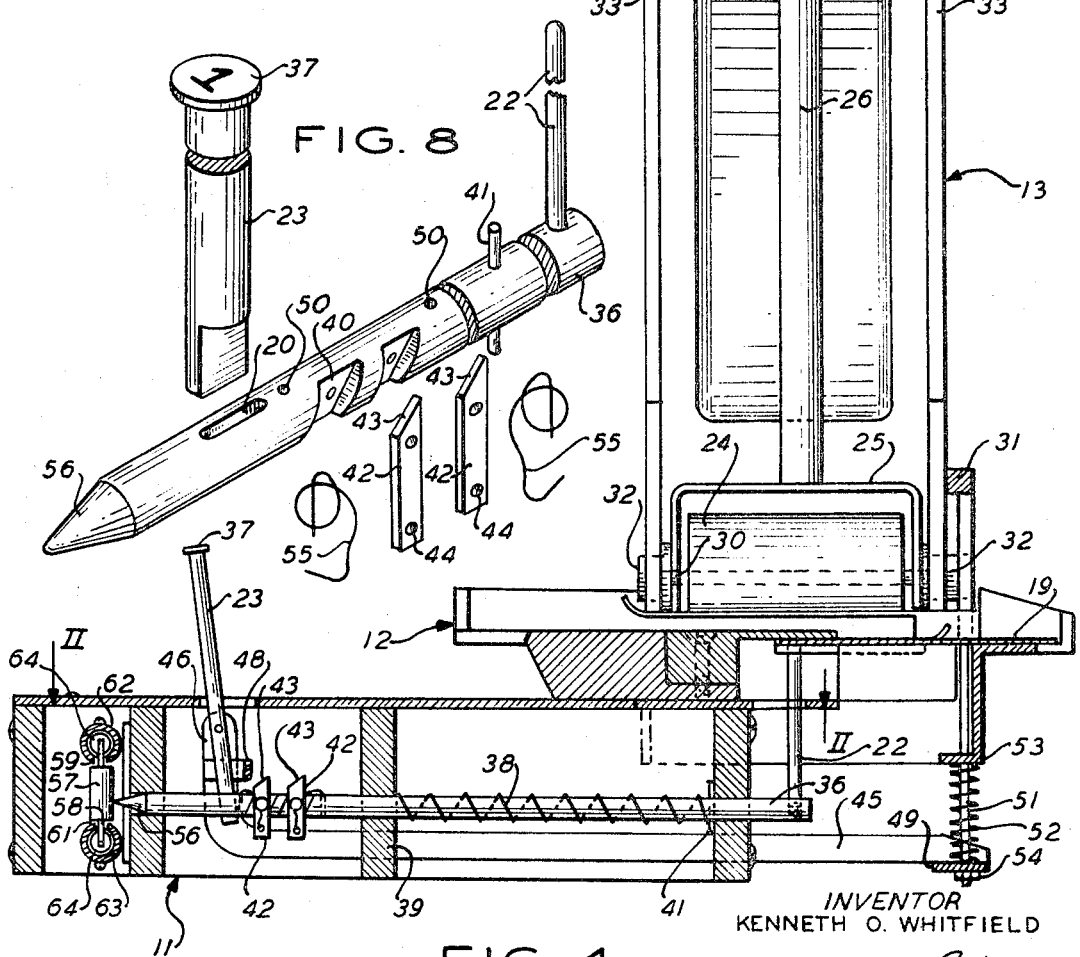
INVENTOR
KENNETH O. WHITFIELD
BY Towson Price
ATTORNEY

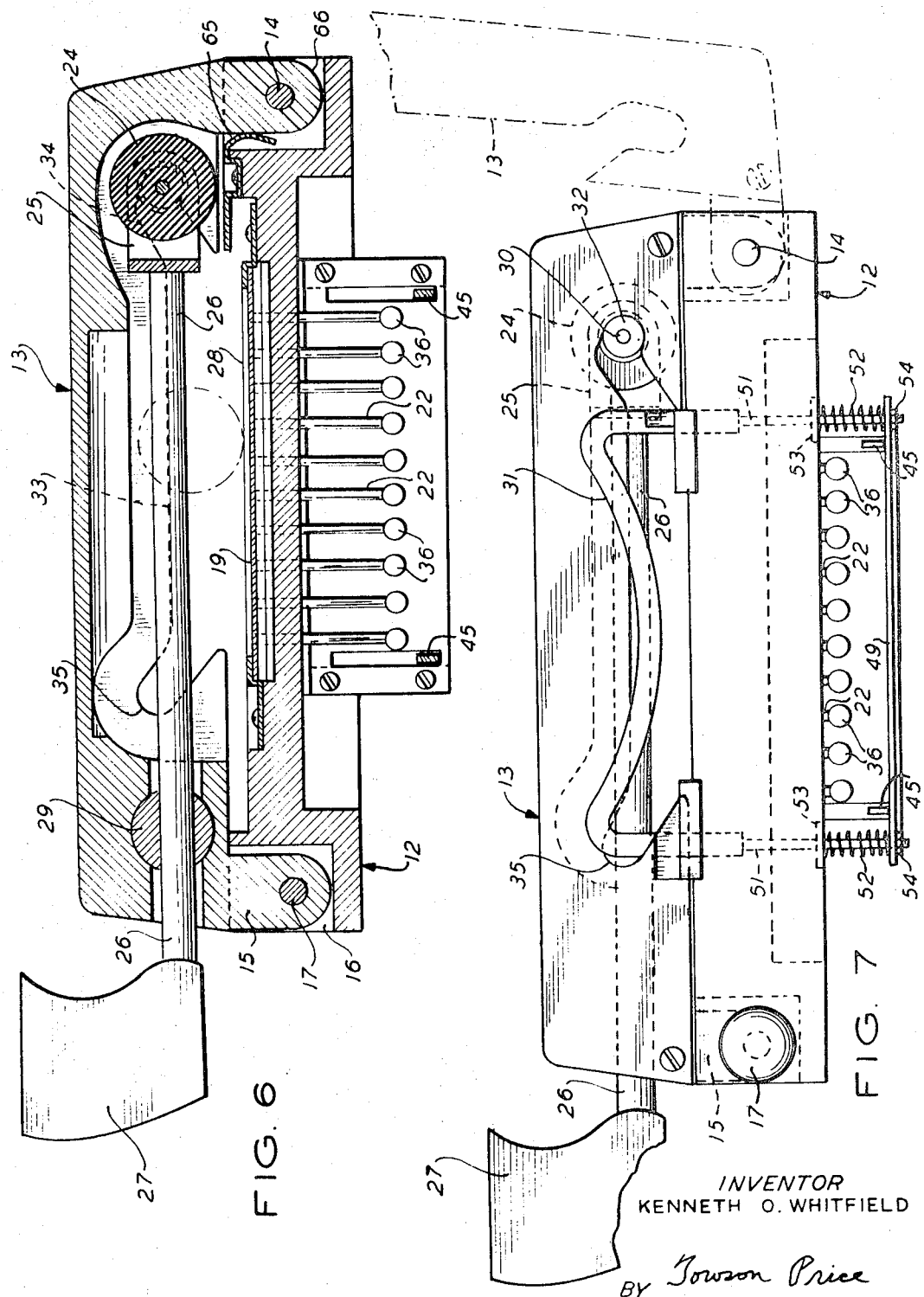

United States Patent Office 3,465,672
Patented Sept. 9, 1969

3,465,672
CREDIT CARD VERIFIER AND PRINT ENABLING MEANS IN PRINTING APPARATUS
Kenneth O. Whitfield, 175 Bloomfield Ave., Montclair, N.J. 07042
Filed Feb. 6, 1968, Ser. No. 703,396
Int. Cl. B41f *3/58, 33/00*
U.S. Cl. 101—269
8 Claims

ABSTRACT OF THE DISCLOSURE

A device for verifying the identity of a prospective customer who presents a credit token with a secret number coded as indicia thereon, prior to extending credit in the sale of merchandise, comprising a series of readout pins spring-biased to neutral positions with top end portions upstanding into a pocket of said device, and elements for individually moving said pins from neutral to set positions, corresponding with information given by the customer as to said number, and thereby only when such information agrees with said coded indicia, as confirmed by the matching of the pins with the token, then permit placement of said token in position for printing an invoice therefrom in said pocket.

---

The present invention relates to apparatus or systems for use with a credit token or card and, more particularly, to apparatus which is capable of checking the validity of a credit card, and facilitating the dispensing of products to credit card holders on an attendant-controlled basis.

In one such system, a prospective purchaser is the holder of a so-called credit card which indicates that he is authorized to receive credit when he presents this card to any of a group of participating vendors, suppliers and other prospective creditors. In such a system, problems may be encountered when an identity token of the foregoing type is stolen or lost and thereafter is used by an unauthorized holder into whose possession it may happen to fall.

Credit cards have achieved an extremely wide acceptance and are utilized for purchasing virtually every type of service and product. In view of the millions of people having credit cards in their possession, it is only reasonable to expect that a small percentage, but yet a large number, will become bad credit risks and hence make it desirable that the credit card be recovered from such a person's possession and that additional credit not be extended to such a user. Many other cards are stolen, lost or otherwise come into the possession of persons other than those to whom they were originally issued, again creating a situation in which it is desirable that they be removed from circulation.

At the present time, repossession of a credit card by the issuing company is effectuated by the expedient of writing a letter requesting the return of the card and by issuing to the commercial establishments authorized to honor the card periodic lists of the numbers of card which are no longer to be honored and which are to be repossessed by the establishment and returned to the issuing agency in the event that they should be discovered. Needles to say, however, many establishments fail to take advantage of such lists of invalid cards because of the time required to check each card presented against such a list, and in some instances, the establishment does not wish to chance possible customer embarrassment.

The present invention is especially applicable to the retail sale and distribution of gasoline and oil, as it is most often accomplished using a credit card. Thus, it is common for various gasoline companies to distribute to their customers credit cards bearing the customer's name and an identification number. Following delivery of the gasoline and/or oil, the attendant transcribes the name and identification number from the card onto a charge ticket along with the quantity of the merchandise delivered and the price of the merchandise. One copy of the charge ticket is provided for the buyer's record and another copy is forwarded to the distributor for billing purposes.

The principles of the present invention will, therefore, be described with reference to a specific preferred embodiment of the present invention, wherein an improved gasoline vending apparatus is provided.

An object of the present invention is to provide a novel product and device for ensuring that only an authorized holder is capable of presenting an identity token in an acceptable manner. The product is an identification token characterized by coded indicia which are not decipherable by inspection but which are intellegibly known by the authorized holder to represent a series of characters. In using this token as a credit card, the holder presents and communicates to the prospective creditor the authorization of the holder by comparing this series of communicated characters, which are set into the device by the prospective creditor, with the series of cryptographically coded indicia on the token which are automatically sensed by the device. If the series of characters communicated by the holder corresponds to the series of characters represented by the indicia, the device will verify the proposed transacation by permitting a record to be printed.

On the other hand, if the series of characters communicated by the holder does not correspond to the series of characters represented by the indicia, the device will reject the proposed transacation by preventing a record being printed. Although the following description is in reference for illustrative purposes to a credit card system, it will be understood that the present invention is applicable to a variety of other systems for use in a plant security equipment, generally accessible equipment operation, bank depository equipment, document release equipment, traveler's check identification, generally accessible coded lock equipment, without fixed combination, passports, and the like. For example, in using this token as a key for a generally accessible coded lock, the holder inserts it into a seat after presetting a manually engageable read-in mechanism.

Other objects of the present invention will in part be obvious and will in part appear hereinafter.

For a fuller understanding of the nature and objects of the present invention, reference should be had to the following detailed description, taken in connection with the accompanying drawings, wherein:

FIGURE 2 is a horizontal sectional view of the device on the line II—II of FIGURE 4, in the direction of the arrows.

FIGURE 3 is a fragmentary elevational view from the right side of the device as shown in FIGURE 1.

FIGURE 4 is a vertical longitudinal sectional view of the device on the line IV—IV of FIGURE 1, in the direction of the arrows, when the printer carriage is in raised position.

FIGURE 5 is a fragmentary view corresponding to FIGURE 4 but showing in full lines one of the member-setting levers in full line position after having been moved to the right and latched in a set position.

FIGURE 6 is a vertical transverse sectional view on the line VI—VI of FIGURE 1 in the direction of the arrows, where the printer carriage is in lowered position.

FIGURE 7 is an elevational view of the right hand end of the device as viewed in FIGURE 3, but with printer carriage in lowered position.

FIGURE 8 is an enlarged exploded view of one of the spring-biased pins, its holder, setting lever, pawls and associated springs.

FIGURE 9 is a plan of a credit token or card usable with a printer frame and carriage embodying my invention.

Figure 1:
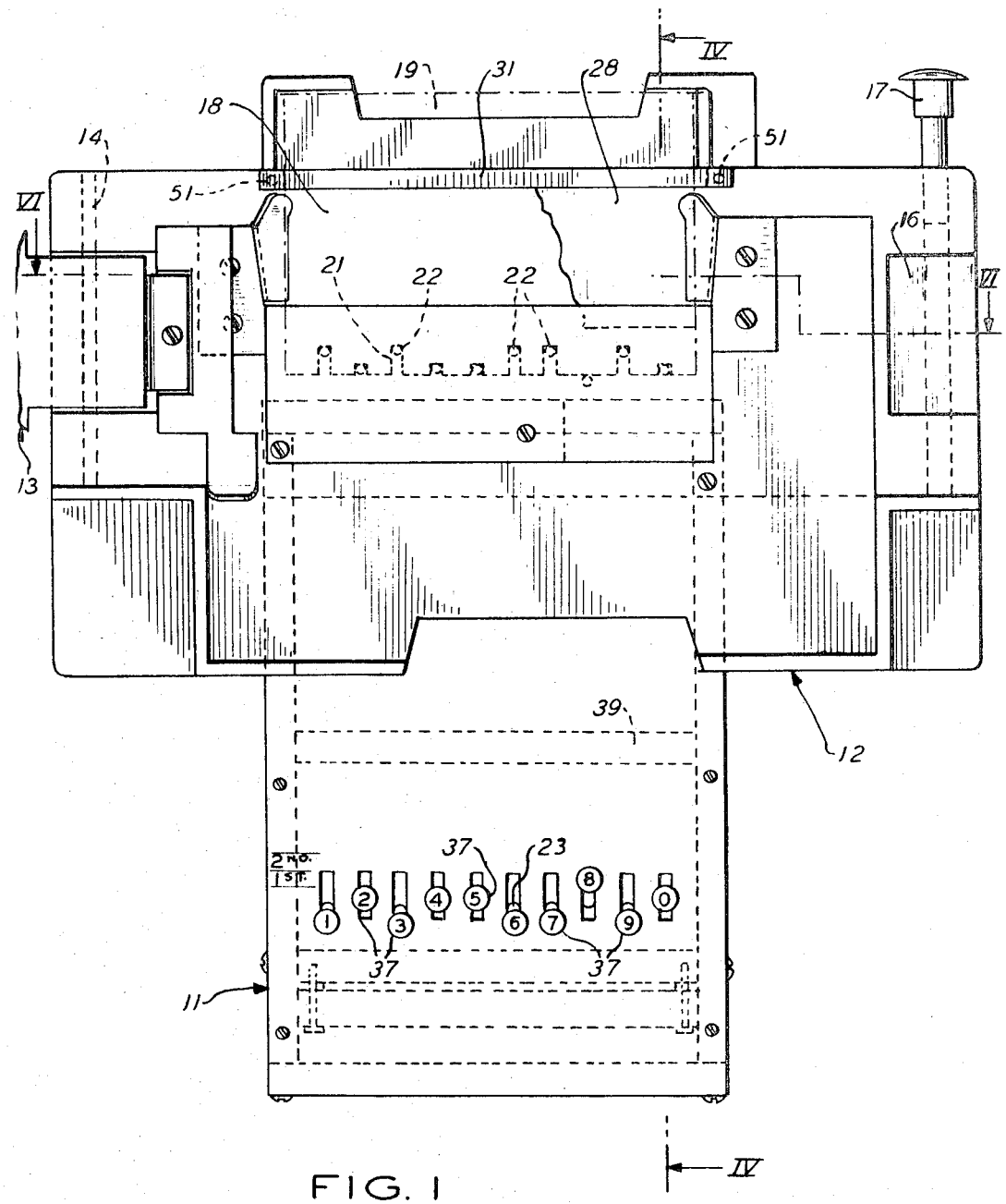
FIGURE 1 is a fragmentary plan of a device embodying my invention, where the printer carriage is in raised position.

Referring to the drawings in detail, the illustrated embodiment of my invention comprises a base 11, a printer frame 12 secured to the top thereof, and a printer carriage 13 pivoted to one end of said frame at one side of said base, as by means of a pin 14. The free end of the carriage 13 has a depending portion 15 which fits a corresponding notch 16 in the frame 12. The portion 15 and the overlapped parts of the frame 12 defining the notch 16 are formed with apertures which register when the carriage is in lowered position. A latching pin or latch 17 is provided to pass through said aperture when the parts have registered and hold the printer carriage 13 in lowered position for effecting a printing operation.

The frame 12 is provided with a pocket 18 in its top face for receiving a credit token or card 19 when said card has been verified by a matching of coded indicia 21 thereof with a series of reabout pins 22. The pins 22 are movable from neutral positions, in which proper or full positioning of the credit card is permitted toward which they are biased, to set positions to correspond with information furnished by the holder of the token 19, and have top portions upstanding into said pocket. There are provided setting or coding elements or levers 23 for individually moving said pins 22 from neutral to set positions, corresponding with the coded indicia of the token 19, to permit the proper and full insertion of the credit card.

There is a printing roller 24 carried by and pivoted between arms of a bail 25 secured to the end portion of an operating rod 26 provided with a handle 27 for moving said roller from the inner position, illustrated in FIGURES 6 and 7, over a positioned token 19, upon which has been placed an invoice form 28 fragmentarily shown in FIGURE 1, and after printing returning it to inner position. During such movement, the rod 26 is guided in a bearing member 29 turnably mounted in the carriage 13, as illustrated most clearly in FIGURE 6. When so moved, the pins 22, which have previously been placed in selected set positions to match the secret number of the token, which should correspond with coded indicia thereof, are released by a setting-release member 31 for return to neutral positions.

The member 31 is engaged by the right hand wheel 32, as viewed in FIGURE 4, on the end of the pivot pin 30 of the roller 24, which wheel has a tread long enough so that it rides thereunder and lifts it to trip the means which hold the pins in set positions. These wheels 32 are flanged on the roller sides and during this time ride on cam tracks 33 defining the lower edges of the side walls of the carriage 13. The tracks 33 terminate in a curved inner stop portion 34 and a curved outer stop portion 35 which limit movement of the roller 24. The parts of the tracks 33 therebetween are positioned below said stop portions so as to move the wheels 32 and their roller down to effect printing by the latter during its travel from inner to outer positions.

The pins 22 are each mounted on a holder 36 slidable longitudinally in the base 11. The lever 23 for each pin has its lower end operatively engaged by its holder, as by fitting it in a slot 20 therein. The upper end of each lever 23 desirably carries a character, such as a number, one of which is detailed at 37 in FIGURE 8. The series of numbers is shown in FIGURE 1 and desirably runs from 1 through 9 to 0. In the present embodiment, the means for biasing the pins 22 comprises a spring 38 coiled about each holder 36 and compressed between a stop portion 39 of the base 11 and a stop pin or other element 41 secured to said holder. Each holder 36 pivotally carries a plurality of pawls 42, one held in each movement-limiting notch 40, with their upper ends cut on a diagonal, as illustrated at 43 in FIGURES 4 and 8, and their lower ends apertured as at 44. There is a pair of pawl-latching and release levers 45, the front or left hand ends of which, as viewed in FIGURE 4, are turned up, as at 46, with their free ends pivoted to the base 11, as at 47.

The lever end portions 46 carry a ratchet bar 48 and are thereby tied together to operate as a unit. The levers 45 are also tied together at their other ends by plate 49 through which pass rods 51, depending from the release member 31. Coil springs 52 encircle the rods 51 and are compressed between said plate 49 and stop portions 53 of the base 11. The rods 51 are adjustably secured to the plate 49 by nuts 54 threaded on said rods. Each pawl 42 is biased so that its upper end 43 will latchingly engage the ratchet bar 48 when its holder 36 is moved by its lever 23 to a pin-setting position. That is, when a lever 23 is moved from the dotted to full line position of FIGURE 5, the first pawl is engaged by the bar 38 as there shown, or upon further movement, a second or other pawl, if employed, is engaged.

The pawl biasing is here effected by a spring 55 for each pawl 42, one end of which spring is received in a pawl aperture 44 and the other end, after tensing the spring, secured to its holder 36, as by fitting in the nearest hole 50 therein. This urges each pawl to its extreme counter-clockwise position, ready for engagement with the ratchet bar 48 after being snapped thereunder as its holder 36 moves from dotted to full-line position, as in FIGURE 5.

In order to prevent the setting of too many pins 22 I point the ends of the holders 36 remote from said pins, as indicated at 56. There is provided a series of rollers 57 rotatably mounted on normally vertical pins 58, the opposite ends of which pins travel in slots 59 and 61 in upper and lower frame mounted tubes 62 and 63, each of which carries a coil spring 64. The ends of said pins engage elements of the springs 64 to resiliently hold them in normal positions. The size and spacing of said rollers is such, that after a few of said pins have been moved from neutral to set positions, said rollers are cramped to positions engaging one another, preventing the movement of other pins to set positions.

From the foregoing disclosure it will be seen that I propose to operate the apparatus as follows:

A customer presents a credit token or card 19 to an attendant dispensing merchandise, an example being gasoline. He gives the attendant the secret number of his card, which in this instance is assumed to be 245880. The proceeding would be the same if the same digits were differently arranged, as in numbers 425808, for example so nobody but one who is told knows the secret number. The attendant moves the lever 23 marked 2 one notch, that is until its first pawl 42 engages the ratchet bar 48 and effects the same movement to the levers marked 4, 5 and 0, latching their pawls on the ratchet bar 48. The lever marked 8 is moved two notches, that is until its second pawl engages and latches on the ratchet bar 48. All the other levers are left untouched. If there were three digits alike, the lever correspondingly marked would be moved three notches, that is until a third pawl (not illustrated) engages the ratchet bar 48.

This means that if the prospective customer's card 19 is notched as indicated in FIGURE 9, this card is insertable in the pocket 18 to a position as viewed in FIGURE 1, where it is printable. An invoice form 28, a fragment of which is illustrated in FIGURE 1, is then applied over the card 19. The carriage 13, desirably held in raised position by frictional engagement of a printer-frame-secured leaf spring 65 with the eccentric hub portion 66 thereof is then swung down, from the position of FIGURE 4 to that of FIGURE 6, and latched in place by insertion of the pin 17 through the registering apertures in the depending portion of the printer carriage 13 and the associated frame 12. The roller 24 is then pulled from the position shown in full lines in FIGURE 6 through the position shown in dotted lines in that figure, where printing of the invoice is effected, until it is stopped after being lifted into engagement with the outer stop portion 35.

During this movement, the setting release member 31 is engaged by the outer wheel 32 and lifted to effect a corresponding lifting of the right hand end of the release levers 45 against the opposition of the return springs 52. This lifting releases or unlatches all the pawls 42, which had been set to engage the ratchet bar 48, by movement in this instance of levers marked 2, 4, 5 and 0 and movement of the lever marked 8 a double distance, so that the second pawl 42 of its holder 36 was engaged.

From this it will be seen that if the holder of the token or card 19 was not the owner and so did not give the correct information for setting the pins 22, it would have been impossible for said card to be inserted in a position where an invoice could be printed therefrom because unnotched portions of the token would be engaged by top end pin portions and proper seating prevented. In this way the attendant would be warned not to supply on credit the gas or other merchandise to the prospective customer. Although only one example has been given for setting the pins to receive a credit card, it will be understood that the setting is effected by moving the setting levers 23 so that the first pawls are latched when the secret number has a single digit of a certain denomination and two distances when the secret number has two digits alike, while not moving any of the levers for digits which do not appear in the secret number furnished by the prospective customer.

Although the card 19 is here shown in its simplest form, yet as a further safeguard there may be provided other notches such as that designated 67, shown dotted and disposed between other notches on the card as dummies, not usable except to confuse a person trying to fraudulently use the card.

Having now described my invention in detail in accordance with the requirements of the patent statutes, those skilled in this art will have no difficulty in making changes or modifications in the individual parts or their relative assembly in order to meet specific requirements or conditions. Such changes and modifications may be made without departing from the scope and spirit of the invention, as set forth in the following claims.

I claim:

1. Vending apparatus for use with a credit token including coded indicia designating secret information and raised indicia identifying the owner of the token, said apparatus including a base, a printer frame secured to the top thereof, a printer carriage pivoted to one end of said frame at one side of said base for swinging between raised and lowered positions, a free end portion of said carriage having an aperture registering with an aperture in a portion of said frame which it overlaps when in lowered position, a latch to pass through said registering apertures in said portions when overlapped, to hold said carriage in its lowered position, a pocket in the top face of said frame for receiving such a token, a series of pins with top end portions upstanding into said pocket, holders for said pins spring biased to neutral positions, coding elements for individually manually moving said holders and their pins from neutral to positions set to match the coded indicia of said token, to overcome interruption to use, and permit placement of said token in printing position in said pocket, releasable means to latch said holders in said set positions, a printing roller manually movable in said carriage to engage an invoice form when laid over said so positioned token to only then print thereon the owner identification, and means raised as said roller is moved to unlatch the releasable means and allow the holders and their pins for return to neutral positions by action of their spring bias.

2. Vending apparatus as recited in claim 1, but usable only with a credit token wherein the secret information is coded along one edge of said token as notches matching the set pins after inserting the token in the apparatus if the token is used as authorized.

3. Vending apparatus as recited in claim 1, wherein the holder for each pin is mounted to slide longitudinally in the base and the lower ends of the pin-moving elements are operably engaged by said holders.

4. Vending apparatus as recited in claim 3, wherein the means for biasing the pins to neutral positions comprises a spring coiled about each holder and held in compression between stops on the base and the respective holders.

5. Vending apparatus as recited in claim 3, wherein there is a plurality of pawls pivotally carried by and spaced along each holder, a spring acts between each pawl and its holder to bias it to latching position, a pair of pawl-release levers with upstanding end portions pivotally carried by said base, connected by a ratchet bar to be engaged by a pawl when its pin is in set position, and means to rotate said levers as the roller is operated to release the pawls for a return of the pins to neutral positions.

6. Vending apparatus as recited in claim 3, wherein the ends of said holders remote from said pins are pointed a series of rollers rotatably carried on normally vertical pins, the opposite ends of which pins travel in slots in coil-spring-carrying tubes and engage elements of said coils to resiliently hold them in position, the size and spacing said rollers being such that after a few of said pins have been moved from neutral to set positions, said rollers are cramped to positions engaging one another, preventing the movement of other pins to set positions.

7. Vending apparatus as recited in claim 5, wherein the roller carries a wheel at one end, the means to rotate the levers comprise a vertically-movable setting release member the upper portion of which curves downwardly between its ends and under which said wheel travels, as the roller is moved to perform a printing operation, to effect a raising of said release member, and the ends of said release member extending down and connecting with the ends of said pawl release levers to effect raising thereof, against the action of return springs, and release of any pawl from engagement with said ratchet bar for return of the pins to neutral positions.

8. A device for verifying the identity of the holder of a token including indicia designating secret information coded along one edge of said token as notches and alphanumeric indicia identifying the owner of the token, said device including a printer frame, a printer carriage pivoted to one end of said frame, a latch for holding said frame in position, a pocket in the top face of said frame for receiving such a token, a series of readout pins with top end portions upstanding into said pocket, holders for said pins spring-biased to neutral positions of said pins where they prevent placement of said token in printing position by engaging unnotched portions of said token edge and coding elements for individually manually moving said holders and their pins from neutral to positions set to match said notches in the token, to overcome interruption to use and permit placement of said token in printing position in said pocket if the token is used as authorized so that its notches receive said top end pin portions.

References Cited

UNITED STATES PATENTS

| | | | |
|---|---|---|---|
| 1,385,788 | 7/1921 | Kirshmer | 101—306 |
| 1,644,229 | 10/1927 | Block | 179—2 |
| 2,555,148 | 5/1951 | Mitchell | 101—306 X |
| 2,664,815 | 1/1954 | Schuessler | 101—19 |
| 2,691,938 | 10/1954 | Bliss | 101—94 |
| 2,714,201 | 7/1955 | Whitehead | 340—149 |
| 2,760,183 | 8/1956 | Singleton | 340—149 |
| 3,048,097 | 8/1962 | Miller | 101—90 X |
| 3,059,570 | 10/1962 | Wagner | 101—19 |
| 3,247,784 | 4/1966 | Condy et al. | 101—19 |

WILLIAM B. PENN, Primary Examiner

U.S. Cl. X.R.

101—285, 306, 322